(12) United States Patent
Colebrooke (10) Patent No.: US 11,473,526 B2
(45) Date of Patent: Oct. 18, 2022

(54) EXHAUST NOZZLE

(71) Applicant: ROLLS-ROYCE plc, London (GB)

(72) Inventor: Jack F. Colebrooke, Bristol (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/072,443

(22) Filed: Oct. 16, 2020

(65) Prior Publication Data

US 2021/0131379 A1    May 6, 2021

(30) Foreign Application Priority Data

Oct. 31, 2019 (GB) .................................... 1915790

(51) Int. Cl.
    *F02K 1/12*      (2006.01)
(52) U.S. Cl.
    CPC ........ *F02K 1/1223* (2013.01); *F05D 2220/32* (2013.01); *F05D 2240/128* (2013.01); *F05D 2240/55* (2013.01)
(58) Field of Classification Search
    CPC .................................................... F01K 1/1223
    See application file for complete search history.

(56) References Cited

U.S. PATENT DOCUMENTS

| | | |
|---|---|---|
| 2,794,317 A | 6/1957 | Brown |
| 2,806,349 A | 9/1957 | Yeager |
| 2,931,169 A | 4/1960 | Glenn |
| 3,004,385 A | 10/1961 | Spears, Jr. et al. |
| 3,643,868 A | 2/1972 | McMurtry |

(Continued)

FOREIGN PATENT DOCUMENTS

| | | |
|---|---|---|
| EP | 0748932 A1 | 12/1996 |
| EP | 0851110 A2 | 7/1998 |

(Continued)

OTHER PUBLICATIONS

Great Britain search report dated Feb. 18, 2020, issued in GB Patent application No. 1915793.2.

(Continued)

*Primary Examiner* — Todd E Manahan
*Assistant Examiner* — Kyle Robert Thomas
(74) *Attorney, Agent, or Firm* — Shumaker & Sieffert, P.A.

(57) ABSTRACT

Disclosed is an exhaust nozzle for a gas turbine engine, the exhaust nozzle comprising an outer frame extending along a longitudinal direction, a convergent petal pivotably attached to the frame and extending axially downstream and radially inward from the pivot, radially within the frame, and a sealing hinge arrangement between an upstream member and a downstream member of the exhaust nozzle. One of the upstream member or the downstream member defines a cylindrical socket having an opening along a cylinder axis which receives a corresponding cylindrical hinge element the other of the downstream member or upstream member, where the upstream member is defined by the frame and the downstream member is the convergent petal; or the exhaust nozzle further comprises a divergent petal downstream of the convergent petal and pivotably attached to the convergent petal, the upstream member being the convergent petal and the downstream member being the divergent petal.

15 Claims, 5 Drawing Sheets

(56) References Cited

U.S. PATENT DOCUMENTS

| | | | |
|---|---|---|---|
| 3,807,637 A * | 4/1974 | Camboulives | F02K 1/1223 239/265.41 |
| 3,873,027 A * | 3/1975 | Camboulives | F02K 1/1223 239/265.33 |
| 4,784,326 A | 11/1988 | Honeycutt, Jr. | |
| 4,994,660 A | 2/1991 | Hauer | |
| 5,111,550 A * | 5/1992 | LeBlanc | E05D 3/02 16/223 |
| 5,150,839 A | 9/1992 | Reedy | |
| 5,779,152 A | 7/1998 | Renggli et al. | |
| 6,195,981 B1 | 3/2001 | Hanley et al. | |
| 6,276,126 B1 | 8/2001 | Bouiller et al. | |
| 9,650,991 B2 | 5/2017 | Jasklowski | |
| 10,371,093 B2 | 8/2019 | Baker et al. | |
| 2004/0065502 A1 | 4/2004 | Yamamoto | |
| 2005/0086927 A1 | 4/2005 | Lair et al. | |
| 2005/0103933 A1 | 5/2005 | Lair | |
| 2005/0126174 A1 | 6/2005 | Lair | |
| 2005/0151012 A1 | 7/2005 | Lair | |
| 2012/0199670 A1 | 8/2012 | Jardine et al. | |
| 2016/0333725 A1 * | 11/2016 | Peters | F01D 25/168 |
| 2020/0025133 A1 | 1/2020 | Watson et al. | |
| 2021/0131378 A1 | 5/2021 | Colebrooke | |
| 2021/0131379 A1 | 5/2021 | Colebrooke | |
| 2021/0222647 A1 | 7/2021 | Colebrooke | |
| 2021/0262415 A1 | 8/2021 | Sidelkovskiy et al. | |

FOREIGN PATENT DOCUMENTS

| | | |
|---|---|---|
| EP | 1045129 | 10/2000 |
| EP | 3336340 A1 | 6/2018 |
| GB | 760519 | 10/1956 |
| GB | 851225 | 10/1960 |
| GB | 871265 | 6/1961 |
| GB | 907526 A | 10/1962 |
| GB | 958307 | 5/1964 |
| GB | 1456280 | 11/1976 |
| GB | 1551216 A | 8/1979 |

OTHER PUBLICATIONS

Great Britain search report dated Feb. 18, 2020, issued in GB Patent application No. 1915792.4.

Great Britain search report dated Feb. 27, 2020, issued in Great Britain application No. 1915790.8.

European search report dated Mar. 3, 2021, issued in EP patent application No. 20202608.

European search report dated Mar. 3, 2021, issued in EP patent application No. 20202609.

European search report dated Mar. 2, 2021, issued in EP patent application No. 20202607.

Response to Extended European Search Report from counterpart EP Application No. 20202607.6 dated Mar. 3, 2021, filed Nov. 4, 2021, 39 pgs.

Response to Extended European Search Report from EP Application No. 20202608.4 dated Mar. 3, 2021, filed Nov. 4, 2021, 33 pgs.

Response to Extended European Search Report from EP Application No. 20202609.2 dated Mar. 3, 2021, filed Nov. 5, 2021, 36 pgs.

* cited by examiner

EXHAUST NOZZLE

CROSS-REFERENCE TO RELATED APPLICATIONS

This specification is based upon and claims the benefit of UK Patent Application No. GB 1915790.8, filed on 31 Oct. 2019, the entire contents of which are incorporated herein by reference.

BACKGROUND

Technical Field

The present disclosure relates to an exhaust nozzle for a gas turbine engine, and a gas turbine engine comprising the exhaust nozzle.

Description of the Related Art

Gas turbine engines may use a variable geometry convergent-divergent (con-di) exhaust nozzle to maximise the production of thrust. A typical exhaust nozzle comprises a plurality of convergent petals which can be pivoted to converge, to reduce the size of an area for air flow exhausting from the engine. The convergent petal and divergent petal are typically attached with a flexible seal which allows for pivoting movement of the convergent petal with respect to a frame, and of the divergent petal with respect to the convergent petal.

SUMMARY

According to a first aspect of the disclosure, there is provided an exhaust nozzle for a gas turbine engine, the exhaust nozzle comprising: an outer frame extending along a longitudinal direction; a convergent petal pivotably attached to the frame and extending axially downstream and radially inward from the pivot, radially within the frame; a sealing hinge arrangement between an upstream member and a downstream member of the exhaust nozzle, wherein one of the upstream member and the downstream member defines a cylindrical socket having an opening along a cylinder axis which receives a corresponding cylindrical hinge element of the other of the downstream member and the upstream member; wherein: the upstream member is defined by the frame and the downstream member is the convergent petal; or the exhaust nozzle further comprises a divergent petal downstream of the convergent petal and pivotably attached to the convergent petal, the upstream member being the convergent petal and the downstream member being the divergent petal; whereby a labyrinth seal is formed by an interface between the cylindrical hinge element and the cylindrical socket.

The convergent petal may be configured to pivot between a contracted position in which the convergent petal is pivoted furthest radially inwards, and an expanded position in which the convergent petal is pivoted furthest radially outwards.

The convergent petal may be angled radially inward at no more than 40 degrees with respect to the longitudinal direction when in the contracted position, the frame of reference being such that 0 degrees would correspond to the convergent petal being parallel with the longitudinal axis. The convergent petal may be angled radially inward at no less than 10 degrees from the longitudinal direction when in the expanded position.

The cylindrical socket of the upstream member or the downstream member may define a radially inner end stop configured to stop pivoting of the downstream member beyond a point in a radially inward direction.

The cylindrical hinge element of the upstream member or the downstream member may comprise a radially outer end stop configured to stop pivoting of the downstream member beyond a point in a radially outward direction.

A gap may be defined between the socket and the cylindrical hinge element of 1 mm or less, preferably of 0.5 mm or less.

The exhaust nozzle may comprise a plenum disposed radially outwardly from the labyrinth seal and configured to receive high pressure air to flow from the plenum and radially inwardly through the labyrinth seal.

The downstream member of the sealing hinge arrangement may be configured to cooperate with a radially outer wall of the plenum to seal the plenum whilst allowing pivoting movement of the downstream member relative the upstream member.

The exhaust nozzle may comprise a divergent petal pivotably attached at an upstream end to a downstream end of the convergent petal, and extending axially downstream and radially outward from the pivot.

The sealing hinge arrangement may be a first sealing hinge arrangement and the exhaust nozzle may further comprise a second sealing hinge arrangement, wherein the upstream member of the first sealing hinge arrangement is defined by the frame, and the downstream member of the first sealing hinge arrangement is the convergent petal, and wherein the upstream member of the second sealing hinge arrangement is the convergent petal, and the downstream member of the second sealing hinge arrangement is the divergent petal.

The plenum may extend along a radially outer side of the convergent petal and may be configured to receive and provide high pressure air to flow through the plenum and radially inwardly through the labyrinth seals of the first sealing hinge arrangement and of the second sealing hinge arrangement.

The plenum may comprise a radially outer wall comprising an upstream part defined by the frame, and a downstream part which is pivotable with respect to the upstream part and may engage with the upstream part to form a seal.

The divergent petal of the sealing hinge arrangement may be configured to cooperate with the downstream part of the radially outer wall of the plenum to seal the plenum whilst allowing pivoting movement of the divergent petal relative to the convergent petal.

The upstream member of the second sealing hinge arrangement may define the cylindrical socket of the second sealing hinge arrangement, and the socket of the second sealing hinge arrangement may terminate at a radially inner end, such that a tangent of the socket at the radially inner end is parallel to the longitudinal direction or extends in a direction having a radially outward component when the convergent petal is in the contracted position. The tangent of the radially inner end may also extend axially or radially outwardly when the convergent petal is in any position between the contracted position and the expanded position.

The divergent petal may be connected to the frame by a linkage, such that the frame, convergent petal, divergent petal, and a linkage form a four-bar linkage.

According to a second aspect, there is provided a gas turbine engine comprising an exhaust nozzle in accordance with the first aspect.

DESCRIPTION OF THE DRAWINGS

Embodiments will now be described by way of example only, with reference to the Figures, in which.

DETAILED DESCRIPTION

Figure 1:
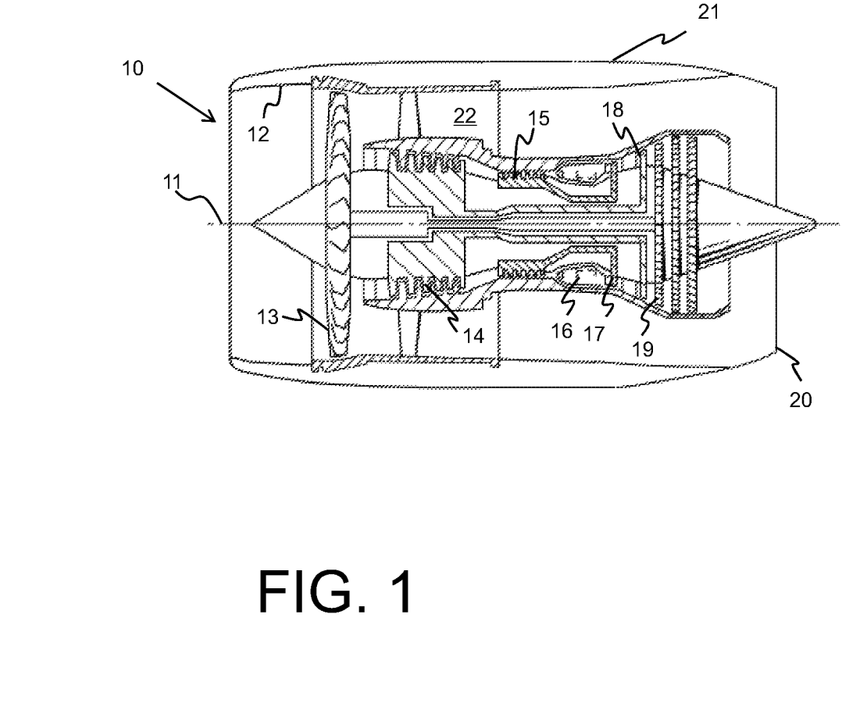
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high-pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high-pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
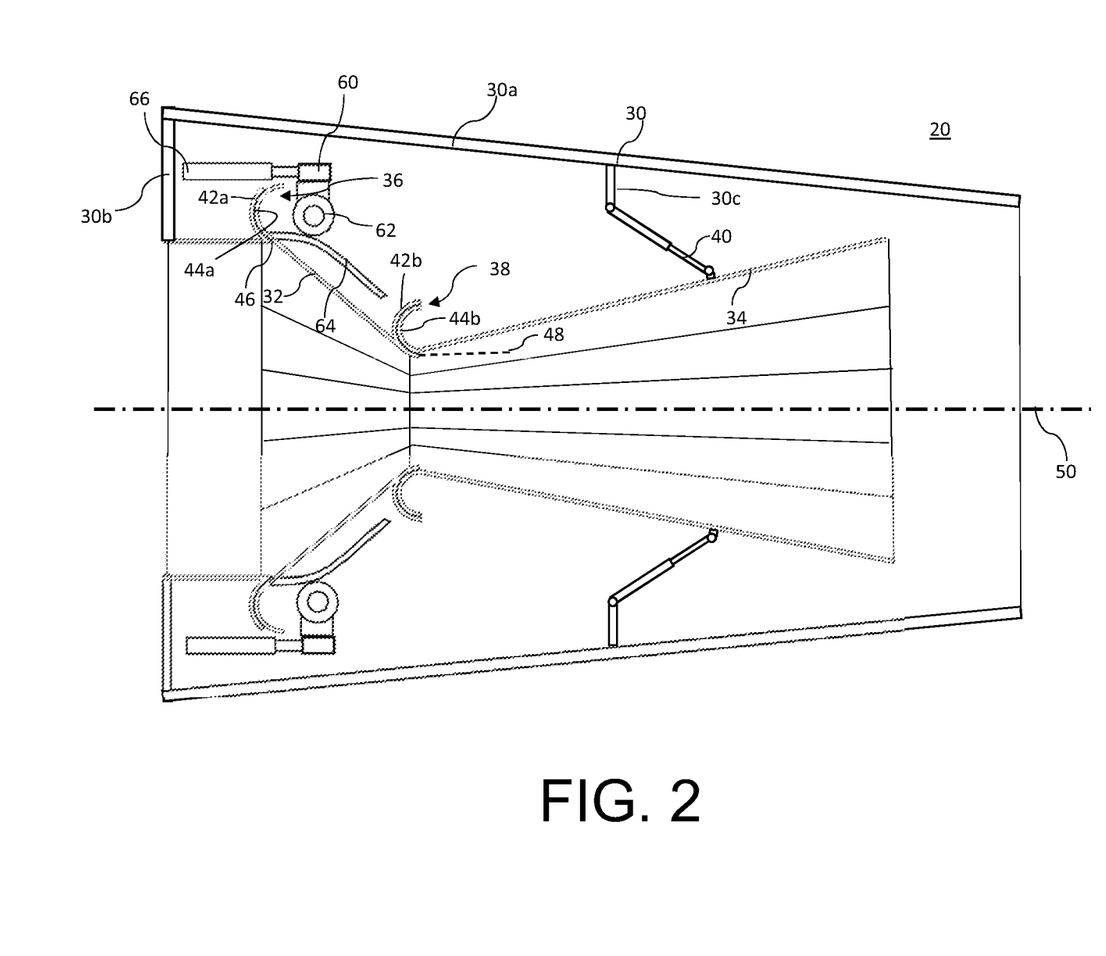
FIG. 2 schematically shows a longitudinal cross-section of a first example exhaust nozzle in a contracted configuration.

FIG. 2 shows a first example exhaust nozzle 20 having a variable converging-diverging (con-di) exhaust in a contracted configuration.

The nozzle 20 comprises a radially outer support frame 30 extending from an upstream end (left side in the Figures) to a downstream end (right side in the Figures) along a longitudinal axis 50, which is coaxial with the rotational axis 11 of the gas turbine engine 10 described with reference to FIG. 1, when the nozzle 20 is mounted in the gas turbine engine 10. The frame 30 comprises an annular portion 30a which is coaxial with the longitudinal axis 50 and which converges from the upstream end to the downstream end (i.e. the radius of the annular portion 30a reduces in a downstream direction along the longitudinal axis 50).

The nozzle 20 comprises a plurality of convergent petals 32 which are angularly distributed about the longitudinal axis 50 within the nozzle 20 at an upstream end of the nozzle 20, and a corresponding plurality of divergent petals 34 which are angularly distributed about the longitudinal axis 50 within the nozzle 20 downstream of (and connected to) the plurality of convergent petals 32. The plurality of convergent petals 32 and divergent petals 34 are configured to provide a converging and then diverging cross-sectional area for air flow exhausting from the gas turbine engine 10, for example to choke the flow and achieve supersonic exit velocities in the divergent section.

The extent of convergence of the convergent petal 32 and the extent of divergence of the divergent petal 34 is variable, as will be explained below. In the contracted configuration, the convergent petal 32 is in a contracted position in which it is at a maximum convergence within its range of angular travel (i.e. it reduces the air flow area to a minimum along the longitudinal axis 50). In this example, the convergent petal 32 in the contracted position is angled radially inwardly at an angle of approximately 40 degrees with respect to the longitudinal axis 50 (with the frame of reference being such that 0 degrees would correspond to the convergent petal 32 being parallel with the longitudinal axis 50). In other examples, the angle of the convergent petal with respect to the longitudinal axis in the contracted position may be less than 40 degrees, such as 35 degrees or 30 degrees.

In the contracted configuration shown in FIG. 2, the divergent petal 34 is in a corresponding maximum dilated position within its range of angular travel, in which it is at a maximum divergence from a point to which it is connected to the convergent petal 32 (i.e. it is pivoted radially outwardly at a maximum angle with respect to the longitudinal axis 50).

The configuration of each convergent petal 32 and respective divergent petal 34 is identical in this example, and as such it will be described below with respect to a single convergent petal 32 and respective divergent petal 34.

The frame 30 comprises a first frame extension 30b extending radially inwards from the annular portion 30a of the frame 30 at an upstream end of the frame 30. The convergent petal 32 is pivotably attached to the first frame extension 30b at a first pivot point comprising a first sealing hinge arrangement 36. The convergent petal 32 extends axially downstream and radially inwardly from the first pivot point (i.e. from the first sealing hinge arrangement 36), in the contracted position.

The divergent petal 34 is pivotably attached to a downstream end of the convergent petal 32, at a second pivot point comprising a second sealing hinge arrangement 38 such that the divergent petal extends downstream and radially outwardly from the second pivot point (i.e. from the second sealing hinge arrangement 38). The divergent petal 34 is pivotably attached to a linkage 40 at a point on the divergent petal 34 downstream of the second sealing hinge arrangement 38. The linkage 40 is pivotably attached to a second frame extension 30c which extends radially inwardly from the annular portion 30a of the frame 30, at a location on the annular portion 30a downstream of the first frame extension 30b. The divergent petal 34 is connected to the linkage 40 and convergent petal 32 such that it extends axially downstream and radially outwardly form the second sealing hinge arrangement 38.

The frame 30, convergent petal 32, divergent petal 34 and linkage 40 therefore form a four-bar linkage, such that pivoting movement of the convergent petal 32 induces predictable pivoting movement of the divergent petal 34. Whilst all members of the four-bar linkage are of constant length, the four-bar linkage is said to have one degree of freedom (i.e. such that for each angular position of the convergent petal 32 there is a single corresponding angular position of the divergent petal 34).

The linkage 40 in this example is a thrust linkage comprising a telescopic extension. The thrust linkage 40 is actuatable to change in length, so that the pivoting movement of the divergent petal 34 in response to pivoting movement of the convergent petal 32 can be adjusted, thereby providing a second degree of freedom in the four-bar linkage.

The nozzle 20 further comprises an actuation arrangement comprising a unison ring 60 disposed radially outwardly of the first sealing hinge arrangement 36. The unison ring 60 is annular and extends around the longitudinal axis 50 within the annular portion 30a of the frame 30. The unison ring 60 is moveable in an axial direction (i.e. along the longitudinal axis 50), and axial movement of the unison ring 60 is controlled by an actuator 66 to which the unison ring is attached.

A roller 62 is fixedly attached to the unison ring 60 at a radially inner side of the unison ring 60. A curved cam 64 is fixedly attached to the convergent petal 64 and is configured to engage and cooperate with the roller 62 so that axial movement of the roller 62 induces radial movement of the cam 64, and therefore pivoting movement of the convergent petal 32 about its pivot point.

Each sealing hinge arrangement 36, 38 is defined between an upstream member and a downstream member. In the first sealing hinge arrangement 36, the first frame extension 30b defines the upstream member and the convergent petal 32 is the downstream member. In the second sealing hinge arrangement 38 the convergent petal 32 is the upstream member and the divergent petal 34 is the downstream member.

In the first sealing hinge arrangement 36, the upstream member (i.e. the first frame extension 30b) defines a first cylindrical socket 42a having an opening along a cylinder axis. The downstream member of the first sealing hinge arrangement 36 (i.e. an upstream end of the convergent petal 32) comprises a first cylindrical hinge element 44a which is configured to be received in the opening of the first socket 42a of the first frame extension 30b. The first socket 42a is configured to receive the first hinge element 44a to form a labyrinth seal by an interface between the first socket 42a and the first hinge element 44a.

The second sealing hinge arrangement 38 is similar to the first sealing hinge arrangement 36. In the second sealing hinge arrangement 38, the upstream member (i.e. a downstream end of the convergent petal 32) defines a second cylindrical socket 42b having an opening along a cylinder axis. The downstream member of the second sealing hinge arrangement 38 (i.e. an upstream end of the divergent petal 34) comprises a second cylindrical hinge element 44b which is configured to be received in the opening of the second socket 42b of the convergent petal 32. The second socket 42b is configured to receive the second hinge element 44b to form a labyrinth seal by an interface between the second socket 42b and the second hinge element 44b.

In this example, the first cylindrical socket 42a has an extension (in this example a linear extension from the cylindrical profile of the socket) on a radially inner side to define a radially inner end stop 46 which is configured to stop pivoting of the convergent petal 32 radially inwardly beyond the contracted position (i.e. to stop pivoting movement of the convergent petal 32 further radially inward from the contracted position). In some examples, the second socket of the convergent petal may alternatively, or additionally, define a similar radially inner end stop configured to stop the divergent petal from pivoting radially inward beyond a point.

In this example, a gap defined between the first and second sockets 42a, 42b and the first and second hinge elements 44a, 44b respectively, is 1 mm. This ensures that the gap is small enough to provide a suitable labyrinth seal, whilst being large enough to permit pivoting, and to account for manufacturing tolerances. In some examples, the gap may be less than 1 mm, such as 0.5 mm, or less than 0.5 mm to provide a better labyrinth seal.

Figure 3:
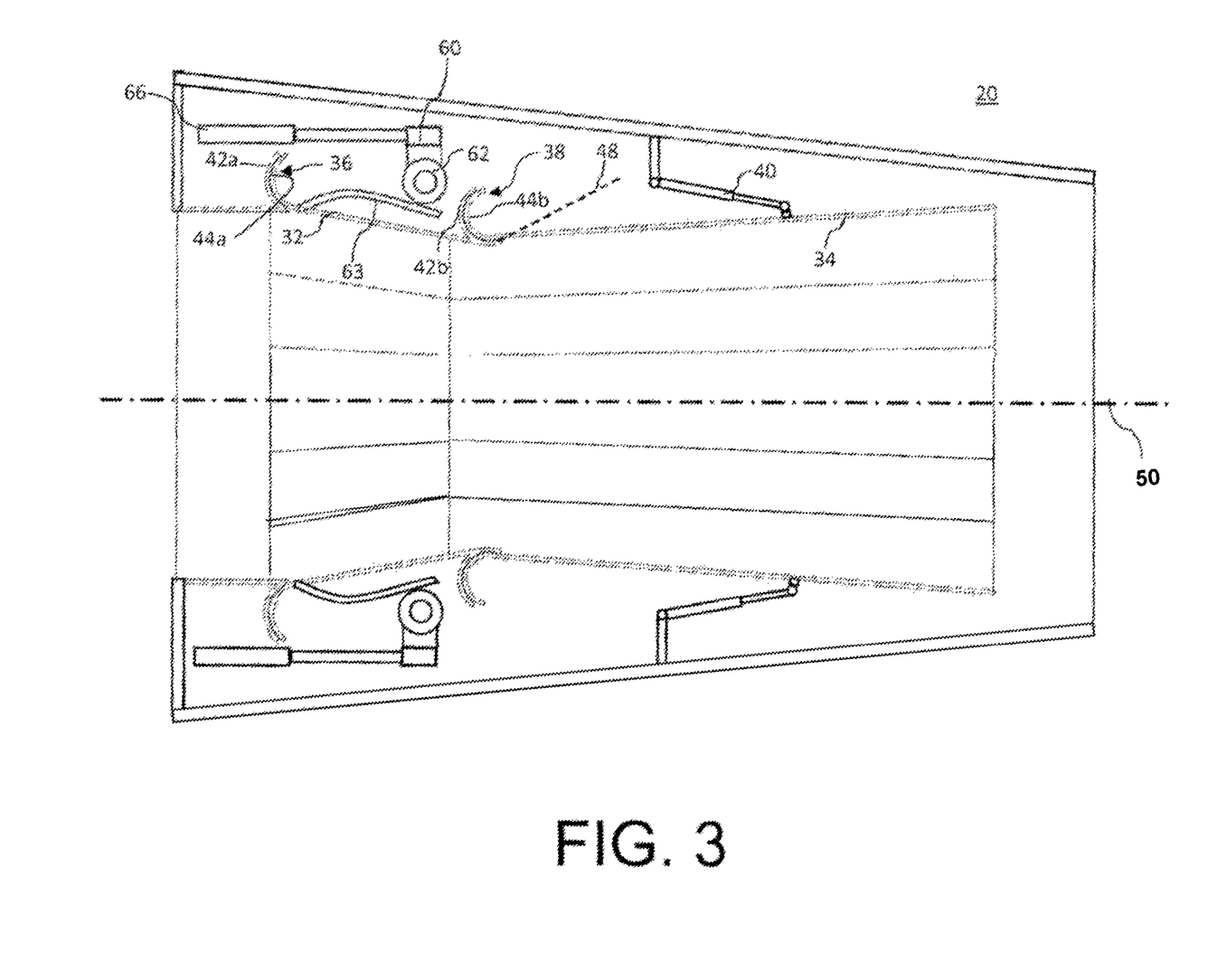
FIG. 3 schematically shows a longitudinal cross-section of the first example exhaust nozzle in an expanded configuration.

FIG. 3 shows the first example exhaust nozzle 20 of FIG. 2 in an expanded configuration. In the expanded configuration, the actuator 66 has moved the unison ring 60 and roller 62 axially downstream, such that the cam 64 is moved radially outwardly (for example under a biasing force or aerodynamic forces within the nozzle). This pivots the convergent petal 32 radially outwardly until the convergent petal 32 is in an expanded position, in which it is pivoted furthest radially outward. The convergent petal 32 in the expanded position is angled radially inwardly at an angle of approximately 10 degrees with respect to the longitudinal axis 50. In other examples, the angle of the convergent petal with respect to the longitudinal axis in the expanded position may be more than 10 degrees, such as at least 15 degrees or at least 20 degrees.

In the expanded configuration, the divergent petal 34 is in a minimum dilation position within its range of travel in which it is as a minimum divergence from the point at which it is connected to the convergent petal 32 for a given thrust linkage 40 length (i.e. it is pivoted at a minimum angle with respect to the longitudinal axis 50 for a given thrust linkage 40 length).

The convergent petal 32 is pivotable between the contracted position (FIG. 2) and the expanded position (FIG. 3). The first and second cylindrical sockets 42a, 42b and respective first and second cylindrical hinge elements 44a, 44b are configured so that a labyrinth seal is formed and maintained between the respective upstream member and the downstream member whilst allowing pivoting movement of the downstream member with respect to the upstream member between the contracted configuration and the expanded configuration.

The second socket 42b terminates at a radially outer end and a radially inner end to define the opening for receiving the second hinge element 44b. In this example, a tangent 48 of the radially inner end of the second socket 42b extends axially when the convergent petal 32 is in the contracted position (FIG. 2), and in a direction having a radially outward component when the when the convergent petal 32 is in the expanded position (FIG. 3). This ensures that the tangent 48 of the radially inner end of the second socket 42b always extends either axially or partially radially outwardly. In other examples, the tangent of the second socket may already extend in a direction having a radially outward component when the convergent petal is in the contracted position, and may extend in a direction having a larger radially outward component as the convergent petal moves to the expanded position.

Having the tangent 48 of the radially inner end of the second socket 42b extend axially or radially outwardly at all positions between the contracted position and the expanded position ensures that in use, when exhaust gasses flow in a downstream direction, the air flow would have to change direction by at least 180 degrees in order to pass through the labyrinth seal of the second sealing hinge arrangement 38. This provides for improved sealing performance.

Figure 4:
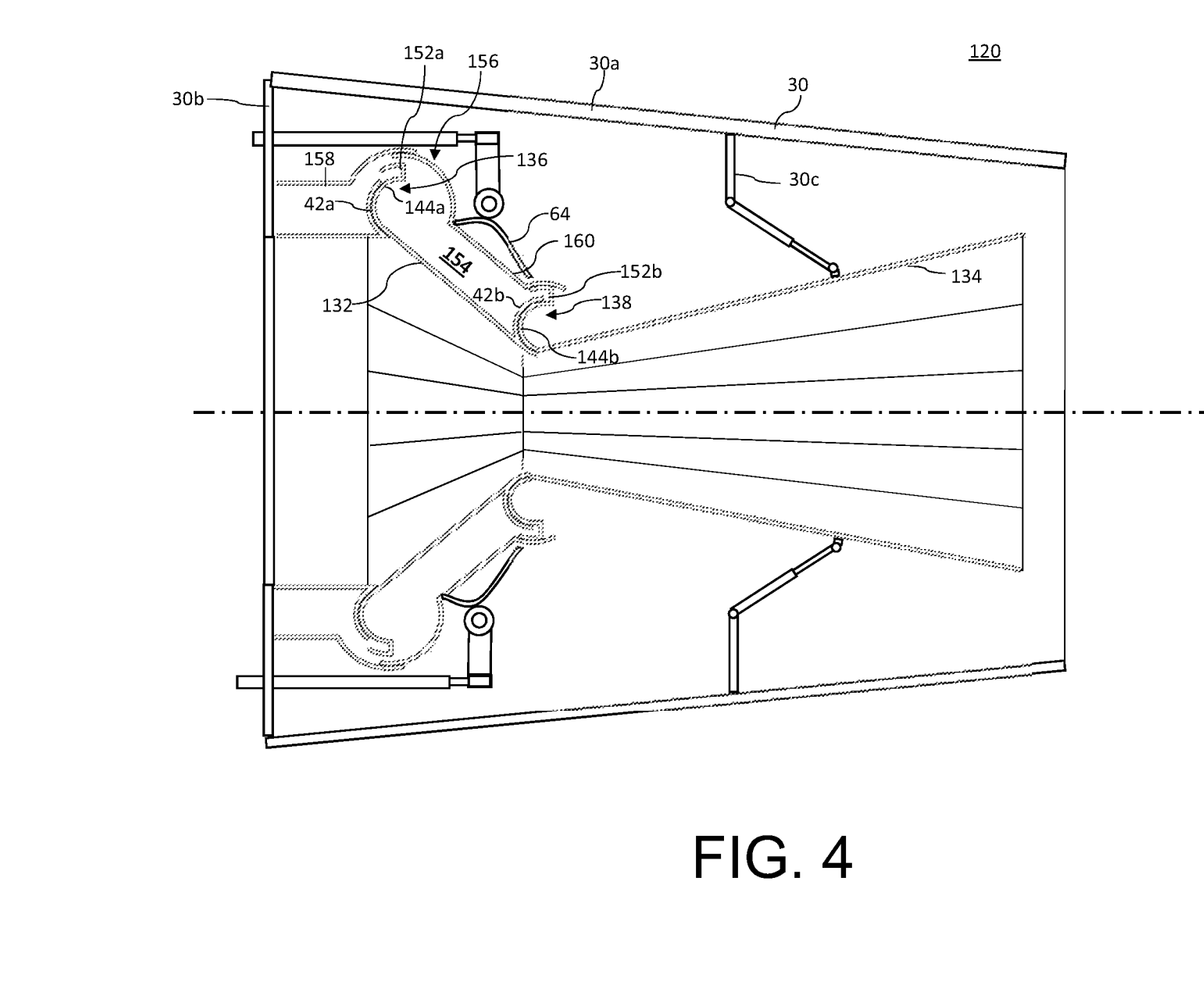
FIG. 4 schematically shows a longitudinal cross-section of a second example exhaust nozzle in a contracted configuration.
Figure 5:
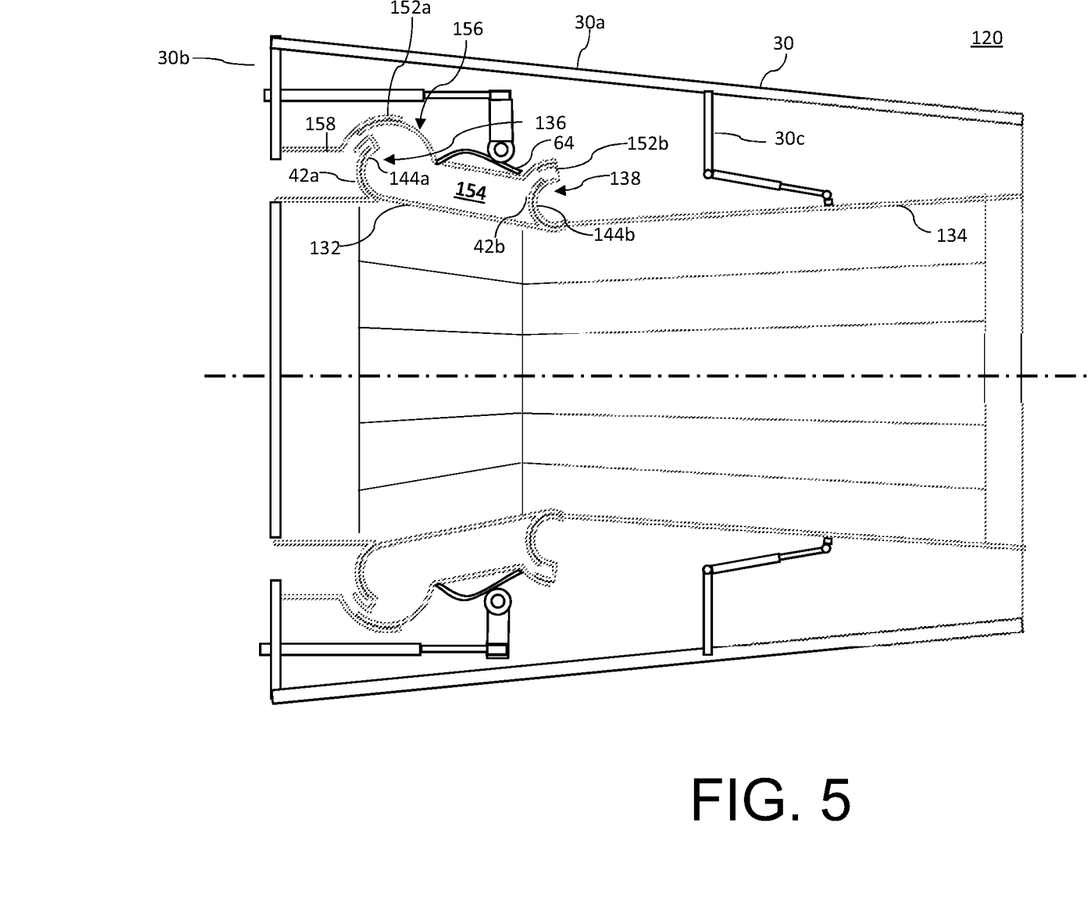
FIG. 5 schematically shows a longitudinal cross-section of the second example exhaust nozzle in an expanded configuration.

FIGS. 4 and 5 show a second example exhaust nozzle 120 having a variable converging-diverging (con-di) exhaust in a contracted configuration and an expanded configuration respectively.

The second example exhaust nozzle 120 is similar to the first example exhaust nozzle 20, in that it comprises the frame 30 having the annular portion 30a, the first frame extension 30b and the second frame extension 30c. It comprises a plurality of convergent petals 132 which are pivotably attached to respective first extensions 30b with a first sealing hinge arrangement 136, and a plurality of divergent petals 134 which are pivotably attached to respective convergent petals 132 with a second sealing hinge arrangement 138 in a similar manner as described with reference to FIGS. 2 and 3.

In this example, the positions of the convergent petal 132 and the divergent petal 134 (i.e. the angles of the petals with respect to the longitudinal axis 50) in the contracted configuration (FIG. 4) and the expanded configuration (FIG. 5) are the same as the positions of the convergent petal 32 and the divergent petal 34 in the first example exhaust nozzle 20 in the corresponding contracted and expanded configurations.

The first sealing hinge arrangement 136 comprises an upstream member (i.e. the first frame extension 30b) defining the first cylindrical socket 42a with an opening as described in the first example exhaust nozzle 20, and a downstream member (i.e. the convergent petal 132) having a first cylindrical hinge element 144a which is configured to be received in the first socket 42a.

The second sealing hinge arrangement 138 comprises an upstream member (i.e. the convergent petal 132) having the second socket 42b with an opening, and a downstream member (i.e. the divergent petal 134) having a second cylindrical hinge element 144b which is configured to be received in the second socket 42b.

The second example exhaust nozzle 120 differs from the first example exhaust nozzle 20 in that the first hinge element 144a comprises a radially outer end stop 152a configured to engage with (i.e. abut) a radially outer portion of the first socket 42a so as to stop further pivoting of the convergent petal 132 in a radially outward direction, beyond the expanded position. The particular form of the radially outer end stop is an elongate trench extending outwardly from the cylindrical portion of the first hinge element with respect to the cylinder axis so as to engage an angular end of the cylindrical socket to prevent radially-outward angular movement of the convergent petal 132.

The second hinge element 144b also comprises a similar radially outer end stop 152b configured to engage with a radially outer portion of the second socket 42b so as to stop pivoting of the divergent petal 134 further radially outward beyond a point such as a maximum dilated position.

In some examples, only one of the first cylindrical hinge element and the second cylindrical hinge element may comprise the respective radially outer end stop.

The second example exhaust nozzle 120 differs further from the first example exhaust nozzle 20 in that the second example exhaust nozzle 120 comprises a plenum 154 disposed radially outwardly from the labyrinth seal of the first sealing hinge arrangement 136 and extending along a radially outer side of the convergent petal 132. The plenum 154 is configured to receive high pressure air to flow from the plenum 154 and radially inwardly through the labyrinth seal of the first sealing hinge arrangement 36 and the second sealing hinge arrangement 138.

The plenum 154 is defined between a radially outer wall 156, the first frame extension 30b, and the convergent petal 132. The radially outer wall 156 comprises an upstream wall 158, and a downstream wall 160 which is pivotable with respect to the upstream wall 158, and engages with the upstream wall 158 to form a seal. The upstream wall 158 comprises a cylindrical profile which cooperates with a corresponding cylindrical profile of the downstream wall 160 to form a labyrinth seal between them according to the principles described above. The high-pressure air through the plenum 154 is colder than the gas flowing through the engine core, such that the seal between the cylindrical profile of the upstream wall and the cylindrical profile of the downstream wall may be a contacting face seal.

In this example, the divergent petal 134 comprises a cylindrical portion which extends from the second radially outer end stop 152b of the cylindrical hinge element 144b, and which is configured to slidingly cooperate with a corresponding cylindrical profile of the downstream wall 160 of the radially outer wall 156 to form a seal between the second sealing hinge arrangement 38 and the radially outer wall 156 of the plenum 154. This seals the plenum whilst allowing pivoting movement of the divergent petal 134 relative to the convergent petal 132.

Providing a sealed plenum 154 as described above enables air to be retained in the plenum at elevated pressure relative to the surrounding environment, such that it can be driven radially inward through the labyrinth seals of the first and second sealing hinge arrangements 136, 138 as a leakage flow, to prevent hot exhaust gasses from flowing radially outwardly through the sealing hinge arrangements 136, 138 into the plenum and surrounding equipment.

The second example exhaust nozzle 120 comprises a similar actuation arrangement to move the nozzle 120 between the contracted configuration and the expanded configuration as that described with reference to FIGS. 2 and 3, but the actuation arrangement differs in that the cam 64 is attached to the downstream end 160 of the outer wall 156 of the plenum 154. Since the convergent petal 132 and divergent petal 134 are attached to the downstream end 160 of the outer wall 156 of the plenum 154 at the second sealing hinge arrangements 128 in this example, pivoting of the downstream wall 160 induces corresponding pivoting of the convergent petal 132 and the divergent petal 134.

Although it has been described that there are two sealing hinge arrangements in the exhaust nozzle, it should be appreciated that there may be only a single sealing hinge arrangement, which may be the first sealing hinge arrangement or the second sealing hinge arrangement. In other examples, the plenum may only extend to one labyrinth seal.

Although it has been described that the exhaust nozzle is a convergent-divergent nozzle, in other examples, the exhaust nozzle may only have a variable converging exhaust, without a divergent section.

Throughout the description, the term "cylindrical" is intended to include partially cylindrical as well as fully cylindrical.

Although it has been described that the upstream member defines the cylindrical socket of the first and second labyrinth seal, and the downstream member defines the cylindrical hinge element of the first and second labyrinth seal, it will be appreciated that the downstream member may define a socket of the first and/or second labyrinth seal, and the upstream member my define a corresponding cylindrical hinge element of the first and/or second labyrinth seal.

What is claimed is:

1. An exhaust nozzle for a gas turbine engine, the exhaust nozzle comprising:
   an outer frame extending along a longitudinal direction;
   a convergent petal pivotably attached to the frame and extending axially downstream and radially inward from the pivot, radially within the frame;
   a divergent petal pivotably attached at an upstream end to a downstream end of the convergent petal, and extending axially downstream and radially outward from the pivot;
   a first sealing hinge arrangement between the frame and the convergent petal of the exhaust nozzle, wherein the frame defines a first arcuate part cylindrical socket having a first opening along a first cylinder axis which receives a corresponding first arcuate part-cylindrical hinge element of the convergent petal;
   wherein a first labyrinth seal is formed by an interface between the first arcuate part-cylindrical hinge element and the first arcuate part-cylindrical socket of the first sealing hinge arrangement;
   wherein the first arcuate part-cylindrical hinge element of the first sealing hinge arrangement is formed by a first arcuate shaped portion of the convergent petal, and the first arcuate part-cylindrical socket of the first sealing hinge arrangement is formed by a second arcuate shaped portion of the frame which slidingly mates with the first arcuate shaped portion of the convergent petal to form the first sealing hinge arrangement;
   a second sealing hinge arrangement between the convergent petal and the divergent petal of the exhaust nozzle, wherein the convergent petal defines a second arcuate part-cylindrical socket having a second opening along a second cylinder axis which receives a corresponding second arcuate part-cylindrical hinge element of the divergent petal,
   wherein a second labyrinth seal is formed by an interface between the second arcuate part-cylindrical hinge element and the second arcuate part-cylindrical socket of the second sealing hinge arrangement;
   wherein the second arcuate part-cylindrical hinge element of the second sealing hinge arrangement is formed by a third arcuate shaped portion of the divergent petal, and the second arcuate part-cylindrical socket of the second sealing hinge arrangement is formed by a fourth arcuate shaped portion of the convergent petal which slidingly mates with the third arcuate shaped portion of the divergent petal to form the second sealing hinge arrangement;
   wherein the second arcuate part-cylindrical hinge element of the second sealing hinge arrangement includes a radially outer end stop, wherein the radial outer end stop is configured to extend around a distal end of the second arcuate part-cylindrical socket element of the second sealing hinge arrangement when in an engaged configuration to stop further pivoting of the divergent petal in a radially outward direction beyond a maximum dilated position; and
   a plenum disposed radially outwardly from the first labyrinth seal and configured to receive high pressure air to flow from the plenum and radially inwardly through the labyrinth seal, wherein the plenum extends along a radially outer side of the convergent petal and is configured to receive and provide high pressure air to flow through the plenum and radially inwardly through the first labyrinth seal of the first sealing hinge arrangement and the second labyrinth seal of the second sealing hinge arrangement.

2. The exhaust nozzle according to claim 1, wherein the convergent petal is configured to pivot between a contracted position in which the convergent petal is pivoted furthest radially inwards, and an expanded position in which the convergent petal is pivoted furthest radially outwards.

3. The exhaust nozzle according to claim 2, wherein the convergent petal is angled radially inward at no more than 40 degrees with respect to the longitudinal direction when in the contracted position.

4. The exhaust nozzle according to claim 2, wherein the convergent petal is angled radially inward at no less than 10 degrees from the longitudinal direction when in the expanded position.

5. The exhaust nozzle according to claim 2, wherein the first arcuate part-cylindrical socket of the first sealing hinge arrangement defines a radially inner end stop configured to stop pivoting of the convergent petal beyond a point in a radially inward direction.

6. The exhaust nozzle according to claim 2, wherein the second arcuate part-cylindrical hinge element of the second sealing hinge arrangement comprises a radially outer end stop configured to stop pivoting of the divergent petal beyond a point in a radially outward direction.

7. The exhaust nozzle according to claim 1, wherein a gap is defined between the socket and the cylindrical hinge element of 1 mm or less.

8. The exhaust nozzle according to claim 1, wherein the divergent petal of the second sealing hinge arrangement is configured to cooperate with a radially outer wall of the plenum to seal the plenum whilst allowing pivoting movement of the divergent petal relative the convergent petal.

9. The exhaust nozzle according to claim 1, wherein the plenum comprises a radially outer wall comprising an upstream part defined by the frame, and a downstream part which is pivotable with respect to the upstream part and engages with the upstream part to form a seal.

10. The exhaust nozzle according to claim 9, wherein the divergent petal of the second sealing hinge arrangement is configured to cooperate with the downstream part of the radially outer wall of the plenum to seal the plenum whilst allowing pivoting movement of the divergent petal relative to the convergent petal.

11. The exhaust nozzle according to claim 1, wherein the convergent petal of the second sealing hinge arrangement defines the cylindrical socket of the second sealing hinge arrangement, and the socket of the second sealing hinge arrangement terminates at a radially inner end, such that a tangent of the socket at the radially inner end is parallel to the longitudinal direction or extends in a direction having a radially outward component, when the convergent petal is in the contracted position.

12. The exhaust nozzle according to claim 1, wherein the divergent petal is connected to the frame by a linkage, such that the frame, the convergent petal, the divergent petal, and a linkage form a 4-bar linkage.

13. A gas turbine engine comprising an exhaust nozzle according to claim 1.

14. The exhaust nozzle according to claim 1, wherein the first arcuate part-cylindrical hinge element of the first sealing hinge arrangement includes another radially outer end stop, wherein the another radial outer end stop is configured to extend around a distal end of the second arcuate part-cylindrical socket element of the second sealing hinge arrangement when in an engaged configuration to stop further pivoting of the convergent petal in a radially outward direction beyond an expanded position.

15. The exhaust nozzle according to claim 1, wherein a surface of the radially outer end stop of the second arcuate part-cylindrical hinge element of the second sealing hinge arrangement defines an arcuate portion that is configured to mate with a matching arcuate portion of a radially outer wall of the plenum to seal the plenum.

* * * * *